(12) United States Patent
Bruendermann

(10) Patent No.: US 8,732,951 B2
(45) Date of Patent: May 27, 2014

(54) METHOD OF MANUFACTURE THROUGH THE WELDING OF FINNED TUBES WITH COOLED GUIDE DISCS ONTO A TUBULAR BODY SET INTO ROTATIONAL MOTION

(75) Inventor: Georg Bruendermann, Thuine (DE)

(73) Assignee: Georg Bruendermann (DE)

( * ) Notice: Subject to any disclaimer, the term of this patent is extended or adjusted under 35 U.S.C. 154(b) by 458 days.

(21) Appl. No.: 13/054,538

(22) PCT Filed: Jul. 2, 2009

(86) PCT No.: PCT/EP2009/058355
§ 371 (c)(1),
(2), (4) Date: Jan. 17, 2011

(87) PCT Pub. No.: WO2010/006930
PCT Pub. Date: Jan. 21, 2010

(65) Prior Publication Data
US 2011/0119917 A1    May 26, 2011

(30) Foreign Application Priority Data

Jul. 16, 2008   (DE) .......................... 10 2008 033 449

(51) Int. Cl.
*B21D 53/06*   (2006.01)
(52) U.S. Cl.
USPC ............ 29/890.046; 29/890.048; 29/890.053; 29/726; 228/200
(58) Field of Classification Search
USPC .............. 29/890.048, 890.046, 890.053, 726, 29/727; 228/46, 183, 200; 65/615
See application file for complete search history.

(56) References Cited

U.S. PATENT DOCUMENTS 1,085,639 A * 2/1914 Snodgrass ........................ 228/13
(Continued)

FOREIGN PATENT DOCUMENTS

| EP | 0349787 A2 | 10/1990 |
| EP | 0604439 B1 | 11/1996 |
| JP | 8047705 A | 2/1996 |

OTHER PUBLICATIONS

Specifications on the welding of metals: http://jonridercom.ipage.com/wp-content/uploads/2011/03/Welding-Dura-Bar.pdf.*
Melting temperature of common metals: http://www.engineeringtoolbox.com/melting-temperature-metals-d_860.html.*

(Continued)

*Primary Examiner* — David Bryant
*Assistant Examiner* — Ruth G Hidalgo-Hernande
(74) *Attorney, Agent, or Firm* — Brooks Kushman PC

(57) ABSTRACT

The invention relates to a method for manufacturing finned tubes made of metal, in particular heat exchanger tubes, where at least one continuous strip forming the fins is fed tangentially to a tubular body set into rotational motion, and wound onto it, the side of the strip facing the tubular body is connected to the tube surface by means of a welding device and using a filler material, and the strip to be wound is guided between guide discs just behind the welding area, said discs reaching close up to the tube surface and the welding point. To increase the service life of the guide discs, the guide discs are cooled, specifically with cooling water to which roughly 10% by volume of a welding release agent are added.

8 Claims, 5 Drawing Sheets

(56) References Cited

U.S. PATENT DOCUMENTS

Figure 1:
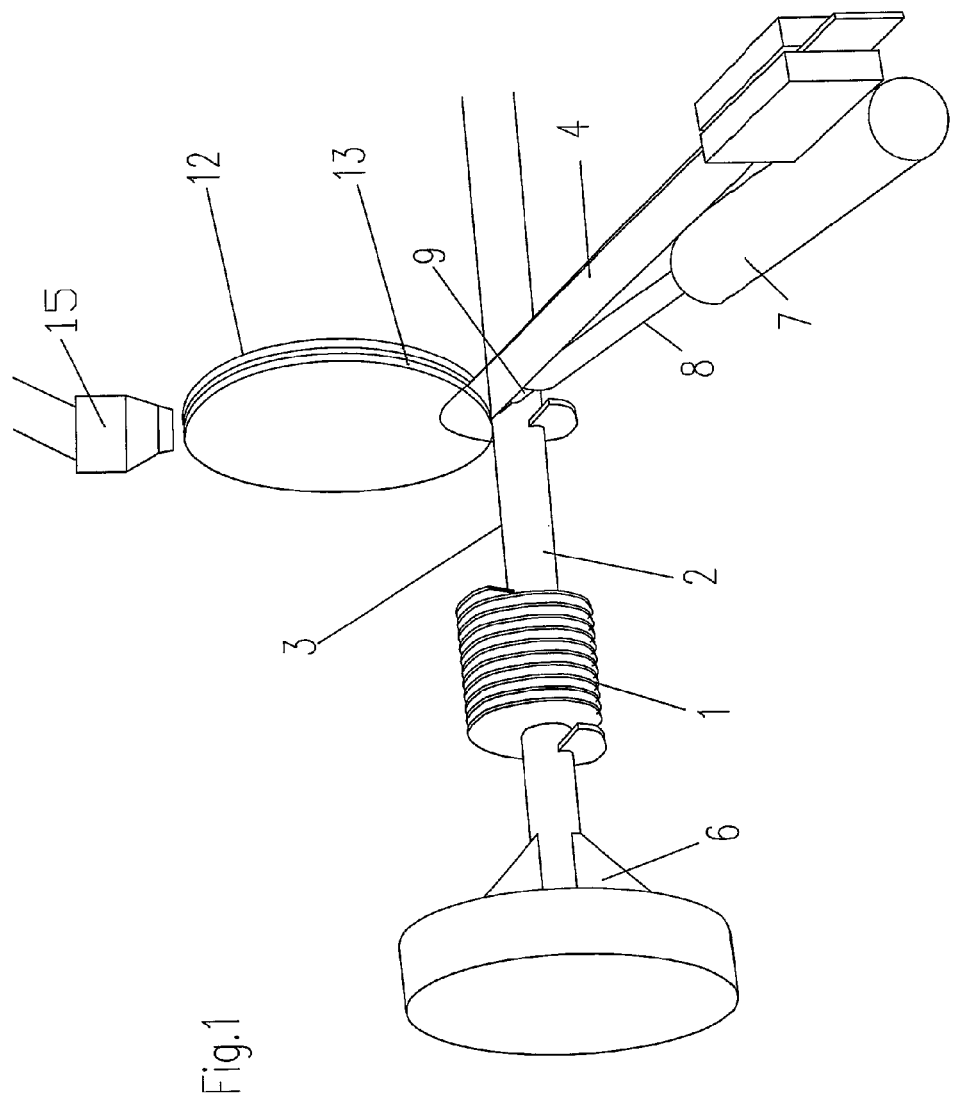

| | | | | |
|---|---|---|---|---|
| 2,988,628 | A | * | 6/1961 | Hall .............................. 219/107 |
| 3,776,448 | A | * | 12/1973 | Fay ............................. 228/17.7 |
| 4,800,034 | A | * | 1/1989 | Akao et al. .................... 508/262 |
| 6,147,317 | A | * | 11/2000 | Brundermann ................. 219/61 |
| 6,166,348 | A | * | 12/2000 | Brundermann ................. 219/61 |
| 2002/0195477 | A1 | * | 12/2002 | Kazama et al. ................. 228/17 |

OTHER PUBLICATIONS

Boiling point of water: http://www.engineeringtoolbox.com/boiling-point-water-d_926.html.*

Diethylenetriamine properties: http://www.chemicalland21.com/industrialchem/solalc/DIETHYLENETRIAMINE.htm.*

International Search Report for PCT/EP2009/058355, Completed by the European Patent Office on Sep. 3, 2009, 6 Pages.

* cited by examiner

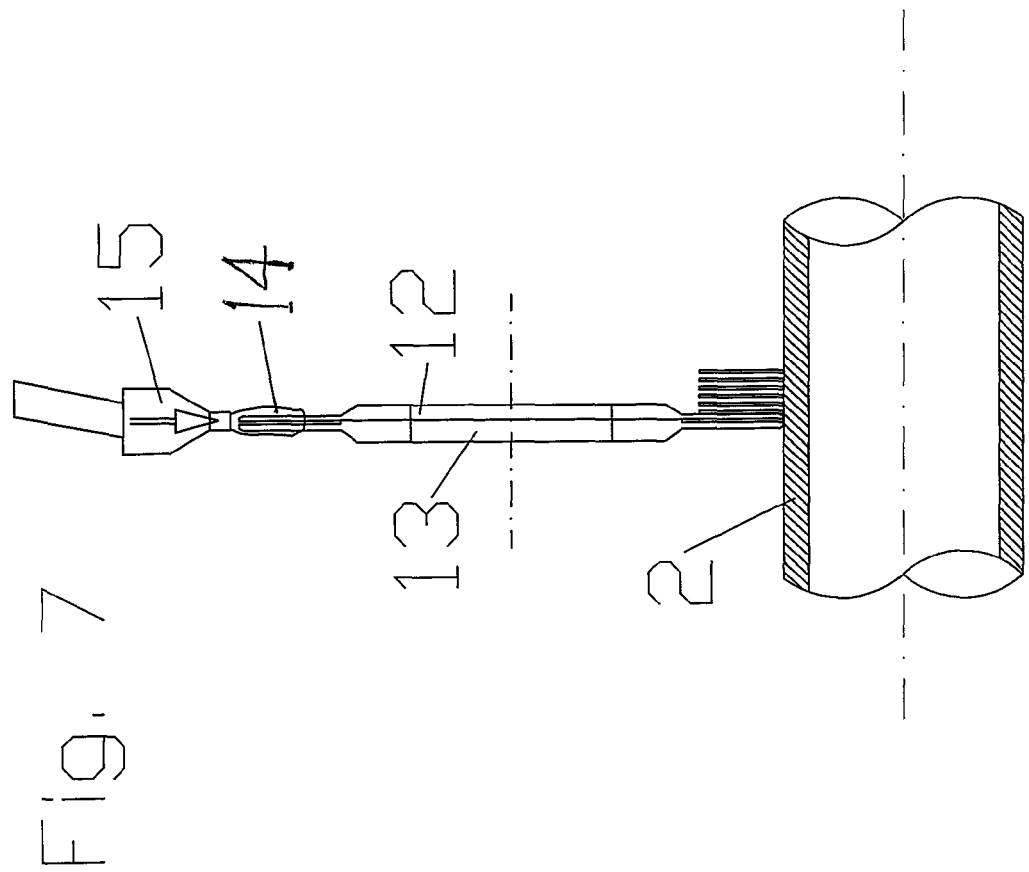

METHOD OF MANUFACTURE THROUGH THE WELDING OF FINNED TUBES WITH COOLED GUIDE DISCS ONTO A TUBULAR BODY SET INTO ROTATIONAL MOTION

The invention relates to a method for manufacturing finned tubes made of metal, in particular heat exchanger tubes, where at least one continuous strip forming the fins is fed tangentially to a tubular body set into rotational motion, and wound onto it in a roughly helical line, the side of the strip facing the tubular body is connected to the tube surface by means of a welding device and using a filler material, the working end of the welding device is guided into the free wedge-shaped gap between the tube surface and the strip to be wound, and the strip to be wound is guided between guide discs just behind the welding area, said discs reaching close up to the tube surface.

A method of this kind is known from EP 0 604 439 B1. Very good results can already be achieved with this known method. The only weakness of this method is the service life of the guide discs that guide the steel strip to be wound in its deflection zone, where it is subjected to extreme deformation. The lower area of the guide discs reaches very close up to the tubular body and the welding point, meaning that it is exposed to a very great heat load and also to the welding spatter occurring in the area of the welding point.

The object of the invention is therefore to protect the guide discs better and increase their service life.

According to the invention, this object is solved in that the guide discs are cooled.

The result of this measure is that the heat load in the critical areas of the guide discs is substantially reduced, and that the welding spatter adheres less readily at the same time.

A cooling liquid is preferably used for cooling. Cooling liquid can easily be applied to the guide discs, meaning that good cooling is achieved by evaporative cooling.

The method can be implemented particularly well if cooling is performed using cooling water, which is not only easy to apply, but also available in sufficient quantities at low cost.

To achieve a particularly advantageous effect, a water-soluble welding release agent is added to the cooling water used. In this context, the welding release agent can be mixed into the cooling water in a quantity in the region of 10% by volume.

The result of this measure is not only that the guide discs are cooled, and the guide disc material thus spared. In addition, as a result of using the welding release agent, welding spatter no longer adheres to the guide discs, meaning that the guide discs retain their smooth surface for a very long period of time, this being a prerequisite for a flawless finned tube.

A mixture of vegetable esters, emulsifiers and stabilisers is preferably used as the welding release agent. A welding release agent of this kind not only has a highly positive influence on the guide discs when using the cooling liquid, but is also biodegradable and completely non-toxic, meaning that it does not constitute a burden either for the operating staff or for the environment.

The cooling liquid is fed to the rotating guide discs at a point remote from the welding point. In this context, the feed point is selected in such a way that the water component of the cooling liquid has evaporated completely shortly before reaching the welding point, meaning that only the welding release agent, which has a higher boiling point than water, adheres to the guide discs in the critical area of the guide discs, meaning that they are optimally protected against welding spatter. The evaporating cooling water not only cools the correspondingly exposed areas of the guide discs. The welding release agent, which has not yet evaporated, is also kept cool at the same time, meaning that it only begins to evaporate in the critical area close to the welding point, thereby not only preventing caking of the welding beads, but also inducing an additional cooling effect in the area of the welding point.

The evaporated welding release agent can be extracted downstream of the welding point.

Figure 2:
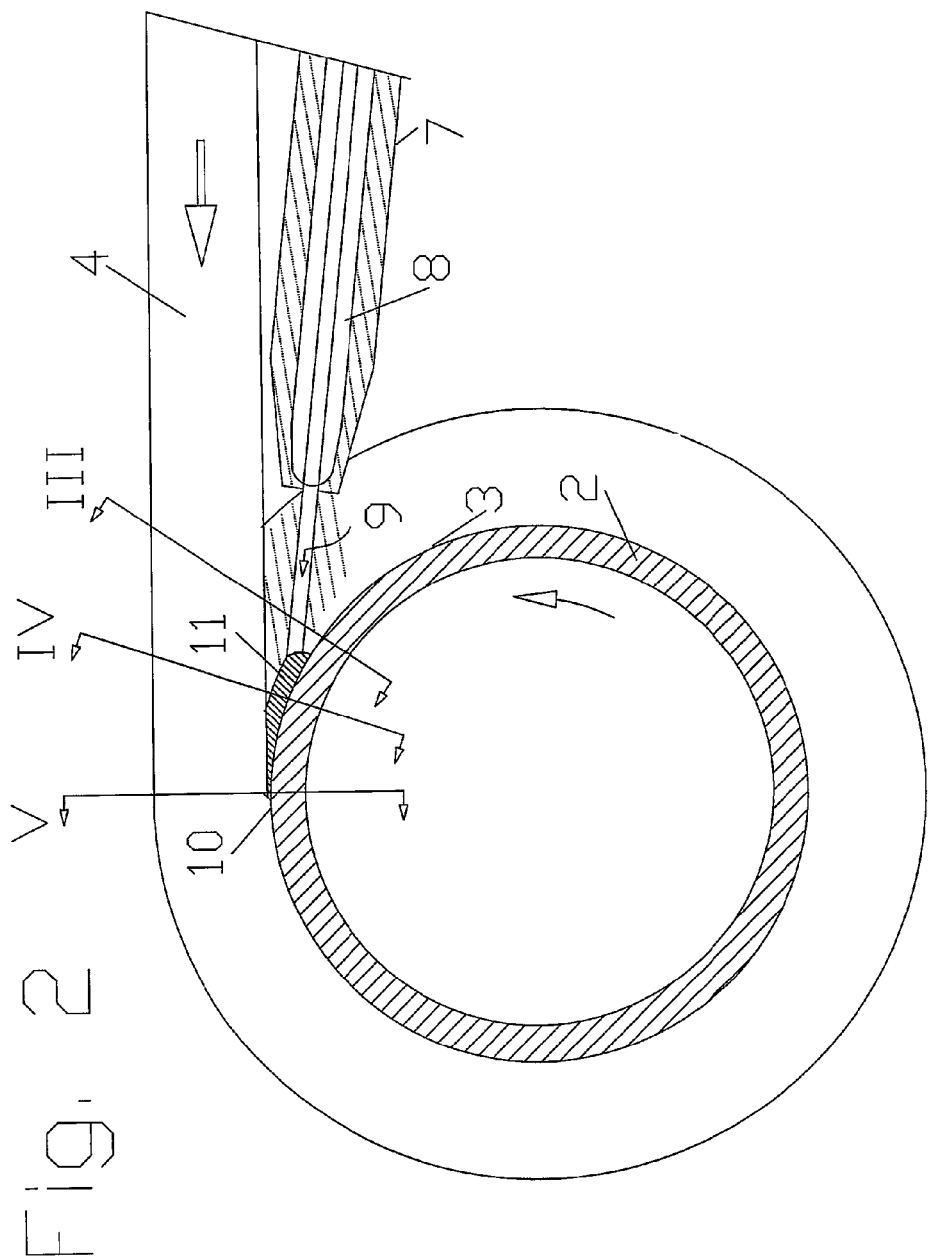
Figure 5:
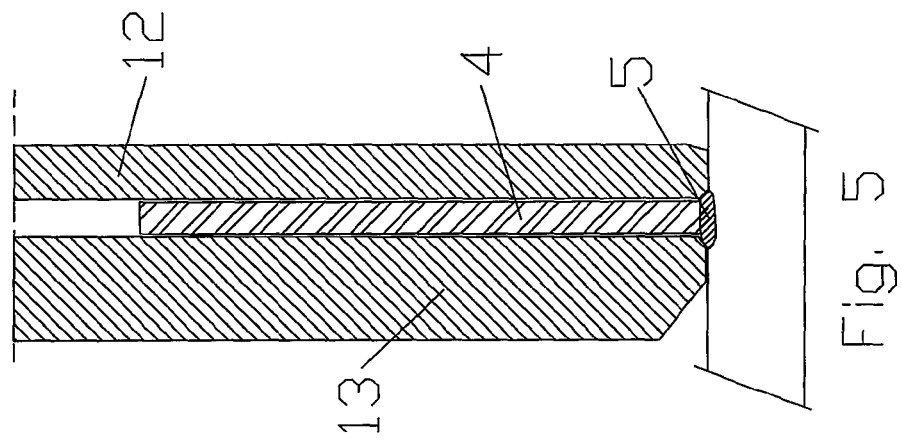
Figure 4:
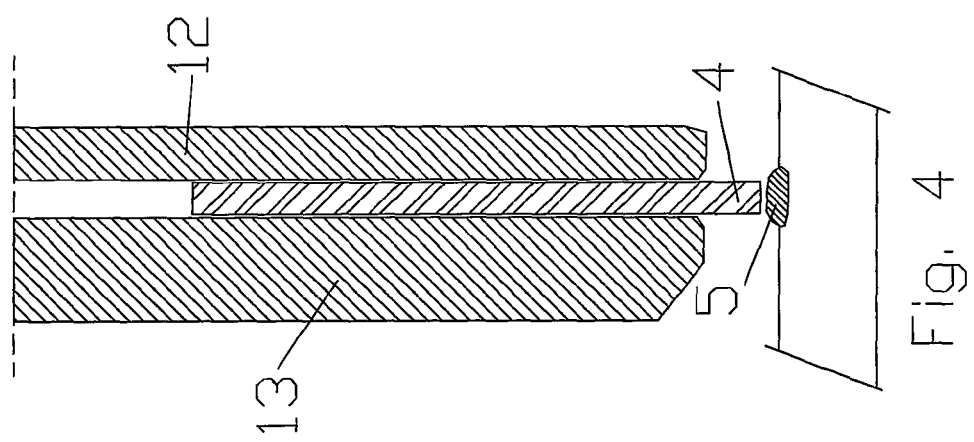
Figure 3:
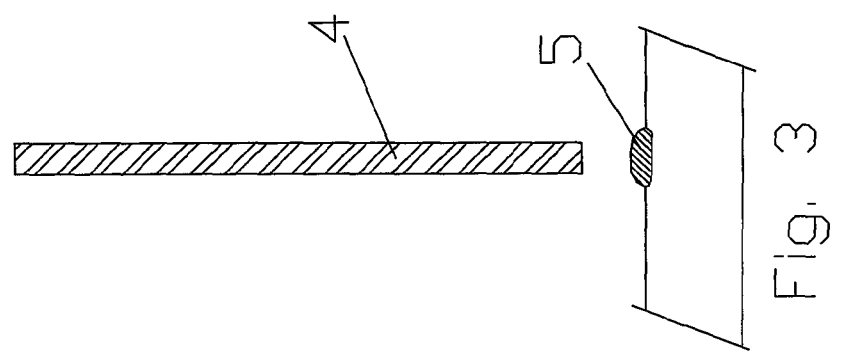
Figure 6:
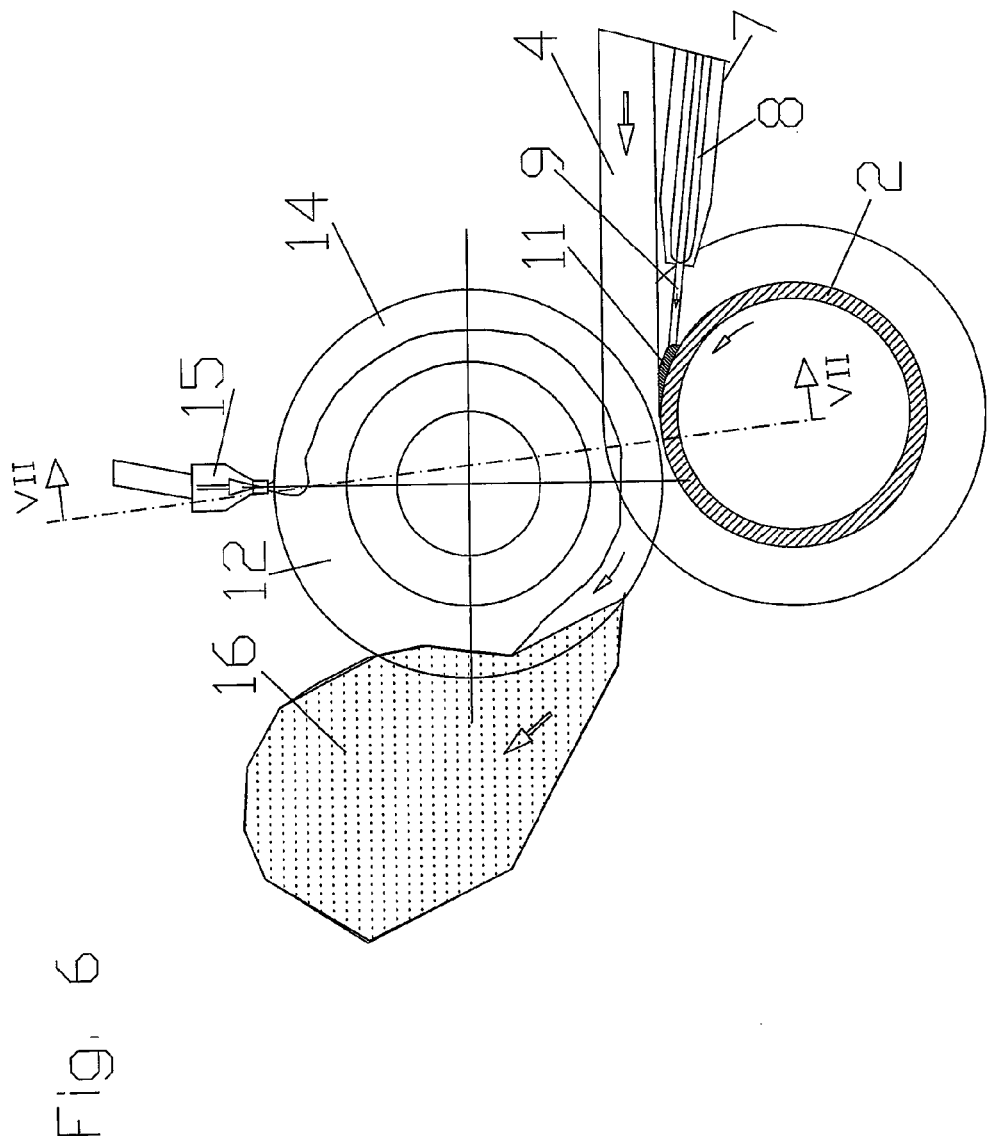

An example of the invention is illustrated in the drawing and described in detail below on the basis of the drawing. The Figures show the following:

FIG. 1 A perspective view of an embodiment of the method according to the invention, where the steel strip forming the fins is wound onto the tubular body in vertical position and in a helical line, and the narrow side of the strip facing the tubular body is connected by means of a weld seam;

FIG. 2 A sectional view through the area of the finned tube where the steel strip to be wound hits the tubular body, is connected to the tubular body by means of the welding device and is guided with the help of the guide discs;

FIG. 3 An enlarged view of a cross-section along Line III-III in FIG. 2;

FIG. 4 A cross-section along Line IV-IV in FIG. 2;

FIG. 5 A cross-section along Line V-V in FIG. 2;

FIG. 6 A cross-section similar to that in FIG. 2, illustrating the feeding of the cooling liquid, and FIG. 7 A cross-section along Line VII-VII in FIG. 6.

The method according to the invention is suitable for use for feeding different strip versions. It is familiar practice to wind the steel strip to be wound onto the tubular body in a position perpendicular to the axis of the tubular body, as illustrated in the drawing. The method according to the invention is particularly suitable for this version, since it leads to surprisingly improved results owing to the great stress on the guide discs. The method according to the invention can, however, also be used if the steel strip to be wound is fed to the tubular body in a U shape or an L shape. Guide discs are also used for these versions, although they are exposed to less stress because they are at least partly shielded from the heat present in the welding area, as well as welding spatter, by the shape of the steel strip being fed. Nevertheless, the service life of the guide discs is also increased when using versions of this kind.

According to the drawing, heat exchanger tube 1, to be manufactured by the method according to the invention, consists of tubular body 2, to surface 3 of which fin strip 4, to be taken from a supply reel, is applied in a helical line to increase the heat exchange surface, and connected to the tube surface via weld seam 5, where the supply reel is, however, not shown in the drawing.

According to FIG. 1 of the drawing, tubular body 2, to surface 3 of which fin strip 4 is to be applied, is held tight by means of clamping device 6, which is set into rotational motion in order to implement the method, thus rotating tubular body 2 about its longitudinal axis. Welding device 7 serves to apply weld seam 5. To perform the welding procedure, either tubular body 2, mounted in clamping device 6, is moved past welding device 7 by displacing clamping device 6, or welding device 7 itself is continuously moved parallel to tubular body 2, on a carriage not shown in the drawing.

Electrode 8 projects from welding device 7 into the free wedge-shaped space between surface 3 of tubular body 2 and fin strip 4 to be wound tangentially onto tubular body 2. Consumable, endless welding wire 9, which serves as welding filler material, can be automatically fed through electrode 8.

In the practical example illustrated in the drawing, welding wire 9 is, as can particularly be seen from FIG. 2, fed in some distance ahead of impact area 10, where fin strip 4 to be wound hits tube surface 3. Welding wire 9 melts in the arc generated between the end of welding wire 9 and tube surface 3, creating welding bead 11 on tube surface 3, into which the narrow side of fin strip 4 facing tubular body 2 is pressed.

As can be seen from the drawing, guide discs 12 and 13 are provided immediately above, or at a short distance behind, impact area 10 of fin strip 4 to be wound onto tubular body 2, said guide discs 12 and 13 laterally reaching over fin strip 4 and holding it in its position perpendicular to tubular body 2.

Guide discs 12 and 13, which reach close up to tube surface 3 and weld seam 5 and rotate in the opposite direction to tubular body 2, are each exposed to an extreme heat load in the area located close to tubular body 2 and weld seam 5. Moreover, they are also exposed to the welding spatter flying out of the welding area, which tends to adhere to the surfaces it hits as a result of its high temperature.

To eliminate these negative influences, guide discs 12, 13 are wetted with cooling liquid 14, which is applied to guide discs 12, 13 by means of spray nozzle 15, which is located roughly above the highest point of guide discs 12, 13. The spray is primarily concentrated on the outer edge area, which is exposed to the greatest heat loads and the welding spatter.

The cooling liquid used is cooling water, into which a water-soluble welding release agent is mixed. The welding release agent is added to the cooling water at a ratio of roughly 10% by volume. A mixture of vegetable esters, emulsifiers and stabilisers is used as the welding release agent. Other suitable welding release agents are, however, likewise possible.

The welding release agent has a higher boiling point than water. As a result, the water component evaporates first, thereby cooling the two guide discs 12, 13. However, this cooling effect also simultaneously keeps the welding release agent cool, meaning that it initially does not evaporate and spreads over the outer areas of the guide discs as a protective film. The cooling liquid supply is optimally set in such a way that the water component evaporates completely just before reaching the welding point, whereas the welding release agent remains on the endangered areas of the guide discs as a protective film. Particularly in the area of the welding point, this ensures very good protection of the guide discs against caking of the welding spatter. Upon entering the area of the welding point, where the edges of the guide discs are again exposed to substantial heating, the release agent finally also evaporates, creating an additional cooling effect for the guide discs.

Evaporated release agent 16 is subsequently extracted downstream of the welding point. To this end, an extractor hood not shown in the drawing can be provided that is operated at negative pressure via an extractor nozzle.

LIST OF REFERENCE NUMBERS

1 Heat exchanger tube
2 Tubular body
3 Tube surface
4 Fin strip
5 Weld seam
6 Clamping device
7 Welding device
8 Electrode
9 Welding wire
10 Impact area
11 Welding bead
12 Guide disc
13 Guide disc
14 Cooling liquid
15 Spray nozzle
16 Evaporated welding release agent

The invention claimed is:

1. Method for manufacturing finned tubes made of metal, in particular heat exchanger tubes, where at least one continuous strip forming the fins is fed tangentially to a tubular body set into rotational motion, and wound onto it in a roughly helical line, the side of the strip facing the tubular body is connected to the tube surface by means of a welding device and using a filler material, the working end of the welding device is guided into the free wedge-shaped gap between the tube surface and the strip to be wound, and the strip to be wound is guided between guide discs just behind the welding area, said discs reaching close up to the tube surface, characterised in that the guide discs are cooled with a cooling liquid and the cooling liquid is fed to the guide discs at a point remote from the welding area and is dosed in such a way that the water component evaporates before reaching the welding area, whereas the welding release agent, which has a higher boiling point than water, only evaporates at or downstream of the welding area.

2. A method according to claim 1, characterised in that the evaporated release agent is extracted downstream of the welding area.

3. A method for manufacturing heat exchanger tubes having metal fins, the method comprising;
   feeding a continuous strip of metal tangentially to a rotating tubular body;
   guiding the strip of metal between guide disks located close to the rotating tubular body and just behind a welding area, the guide disks located parallel to and coaxially spaced from each other, forming a gap to accept the strip of metal to be guided;
   wrapping the strip of metal around the rotating tubular body to form a helical metal fin;
   welding the side of the helical metal fin that faces the tubular body to the tubular body using a filler material by placing the working end of a welding device into the wedge-shaped gap between the tube surface and the strip of metal being wrapped; and
   cooling the guide discs with a cooling liquid comprising water and a water-soluble welding release agent having a higher boiling point than water, that is fed to the guide discs at a point remote from and above the welding area so that cooling liquid flows downward between the parallel guide discs and along the strip of metal wherein the cooling liquid feed point is selected in such a way that the water component evaporates before reaching the welding area, the welding release agent adheres to the guide disc and advances to the weld area whereupon the welding release agent evaporates at or downstream of the welding area.

4. A method according to claim 3, characterised in that roughly 10% by volume welding release agent are added to the cooling water.

5. A method according to claim 3, characterised in that a mixture of vegetable esters, emulsifiers and stabilisers is used as the welding release agent.

6. A method according to claim 3, characterised in that the cooling liquid is sprayed onto the guide discs.

7. A method according to claim 3, characterised in that the evaporated release agent is extracted downstream of the welding area.

8. A method according to claim 3, characterised in that a mixture of vegetable esters, emulsifiers and stabilisers is used as the welding release agent.

\* \* \* \* \*